United States Patent [19]

Lawton

[11] 4,042,446

[45] Aug. 16, 1977

[54] CORRUGATED BOARD-MAKING MACHINERY

[75] Inventor: Bernard Gaskell Lawton, Stockport, England

[73] Assignee: Henry Simon Limited, Stockport, England

[21] Appl. No.: 604,549

[22] Filed: Aug. 14, 1975

[51] Int. Cl.² .............................................. B32B 31/00

[52] U.S. Cl. .................................... 156/359; 156/378; 156/470

[58] Field of Search ................ 156/205, 210, 470–473; 100/151, 154; 186/60, 64, 359, 378

[56] References Cited

U.S. PATENT DOCUMENTS

| | | | |
|---|---|---|---|
| 1,206,530 | 11/1916 | Gordon | 156/582 X |
| 1,750,943 | 3/1950 | Schroeder | 156/582 X |
| 2,357,826 | 9/1944 | Hohl | 100/151 X |
| 2,680,470 | 6/1954 | Stanton | 156/582 |
| 2,993,527 | 7/1961 | Moser et al. | 156/555 X |
| 3,753,838 | 8/1973 | Brandenburg | 100/154 X |
| 3,829,338 | 8/1974 | Hatasi et al. | 156/64 |

*Primary Examiner*—David A. Simmons
*Attorney, Agent, or Firm*—Norris & Bateman

[57] ABSTRACT

Apparatus for supplying heat and pressure to a corrugated paper board comprising heated means for supporting a web of the board as it is drawn thereover, an endless belt whose lower flight is adapted to overlie the web while it is drawn over said heated means and a plurality of freely rotatable transversely extending parallel longitudinally spaced rolls engaging the upper surface of the lower flight of said belt, at least some of said rolls being journaled in bearings located in pivoted levers, there being resilient spring means for applying a variable force to said levers, whereby an adjustment of the effective weight of at least some of the rolls on said belt may be made.

5 Claims, 2 Drawing Figures

CORRUGATED BOARD-MAKING MACHINERY

This invention concerns equipment for the manufacture of corrugated board comprising a fluted paper medium which is faced on both sides with a paper liner, and more particularly to apparatus for applying heat and pressure to such a board for the purpose of curing the adhesive bonding the components thereof together.

In conventional apparatus a web of corrugated board is pulled over steam chests and is pressed against the upper-surface of such chests by the under-surface of the lower flight of an endless cotton belt which is loaded downwardly by spaced transversely extending parallel freely rotatable weight rolls engaging the upper-surface of the lower flight.

In order to control the amount of heat supplied to the board it is desirable to be able to adjust the loading on the cotton belt and hence the pressure between the board and the steam chests. Commonly this has been achieved by varying the number of weight rolls engaging the belt by lifting and supporting some thereof in an elevated position.

In our co-pending British Patent Application No. 38438/71 we have described an arrangement wherein all of the weight rolls remain in engagement with the belt but including means for varying the effective weight of such rolls.

The present invention is concerned with apparatus of this latter kind.

According to the present invention, apparatus for supplying heat and pressure to a corrugated paper board comprises heated means for supporting a web of the board as it is drawn thereover, an endless belt whose lower flight is adapted to overlie the web whilst it is drawn over said heated means and a plurality of freely rotatable transversely extending parallel longitudinally spaced rolls engaging the upper surface of the lower flight of said belt, at least some of said rolls being journaled in bearings located in pivoted levers, there being resilient spring means for applying a variable force to said levers, whereby an adjustment of the effective weight of at least some of the rolls on said belt may be made.

Preferably adjustment of the resilient spring means is effected automatically in response to a temperature sensing device at the outlet end of the apparatus or in response to the speed at which the board is pulled over the heated means.

The invention will be further apparent from the following description with reference to the figures of the accompanying drawings, which show, by way of example only, a double facing machine including apparatus embodying the invention.

Figure 1:
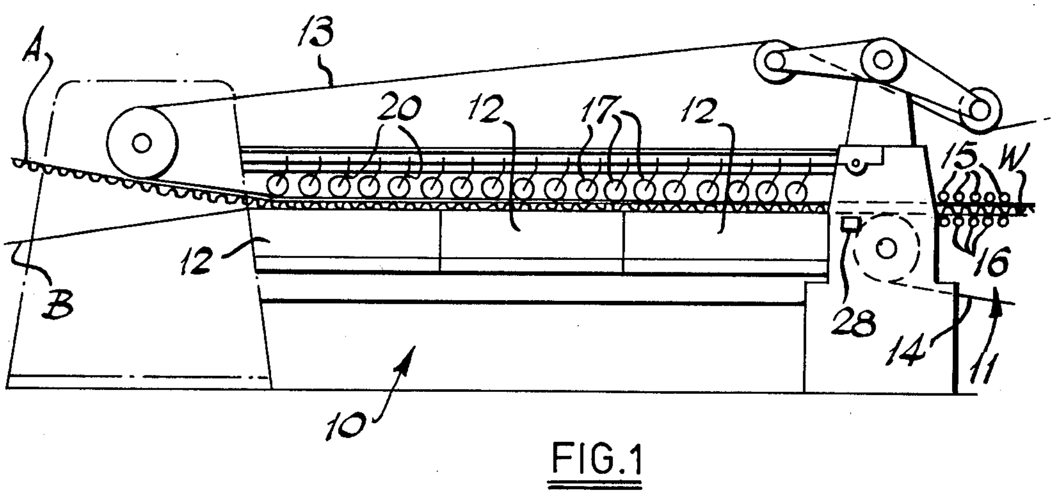
Figure 2:
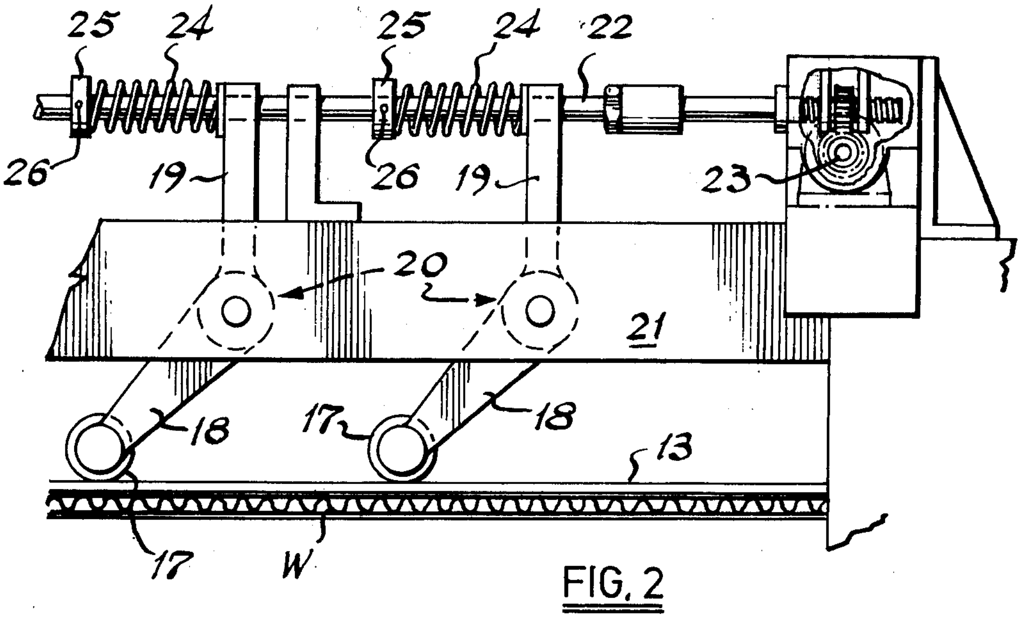

Of the drawings:

FIG. 1 shows a diagrammatic side elevation of part of the double facing machine; and FIG. 2 shows a detailed view of part of the apparatus of FIG. 1 on an enlarged scale.

Referring to the drawings, it will be seen that the double facing machine comprises a heating section generally indicated at 10 and a pulling section generally indicated at 11 (only part of which is shown on the drawing).

In known manner a single faced corrugated web A is united with a paper liner B which is adhered thereto by adhesive on the downwardly directed peaks of the fluted paper medium of the web A to form a web of double faced corrugated board W. The web W is pulled through the heating section 10 by the pulling section 11.

The heating section 10 comprises a plurality of heated support units comprised by steam chests 12 arranged in end-to-end relationship and presenting an upwardly directed coplanar surface over which the web is drawn. The web is pressed into engagement with this support surface by the underside of the lower flight of an endless cotton belt generally indicated at 13.

The belt 13 extends over the entire length of the machine through both the heating section 10 and the pulling section 11. In the pulling section 11 a further endless belt 14 is provided beneath the web of board, and in this section the board is gripped between the belts 13 and 14 which are urged into pressurised engagement therewith by rollers 15 and 16 bearing against the upper surface of the lower flight of the belt 13 and the under-surface of the upper flight of the belt 14 respectively.

In the heating section 10 the lower flight of the belt 13 is urged against the board W by a plurality of parallel spaced transversely extending freely rotatable weight rolls 17. As best seen from FIG. 2 each of the weight rolls 17 is journaled in bearings at the lower end of the downwardly directed arm 18 of a bell crank lever 20 pivotably connected to a frame member 21 extending longitudinally of the machine over the length of the heating section 10. The upwardly directed arm 19 of each bell crank lever 20 is provided with an aperture adjacent its end. A rod 22 extending the length of the heating section 10 passes through the apertures in each of the arms 19 of the bell crank levers 20. An actuator 23 containing a worm, wormwheel and a reversible electric driving motor is provided and connected to the rod 22 at one end thereof, whereby the rod may be moved to the left or right in a reciprocatory fashion. A compression spring 24 is provided for each of the bell crank levers 20 and surrounds the rod 22 in such a manner that one of its ends bears on the lever 19 on the inner side thereof. The other end of each compression spring 24 is located in a cup member 25 secured to the rod 22 by means of a pin 26.

It will be appreciated that as the rod 22 is moved towards the right an increasing force is applied to each of the arms 19 of the bell crank levers 20 which has the effect of tending to lift the rolls 17 from engagement with the belt 13 and thus reducing their effective weight. In like manner, as the rod 22 is driven towards the left the force applied to the arms 19 of the bell crank levers 20 by the springs 24 is reduced with the result that the effective weight of the rolls 17 on the belt 13 increases up to a maximum corresponding to the actual weight of the rolls 17.

In a preferred embodiment, a temperature sensing device 28 is provided to measure the temperature of the corrugated web leaving the heating section 10 of the machine. The motor driving the actuator 23 is controlled automatically in response to the measured temperature to tend to maintain such temperature constant and at a predetermined value. Thus, if the temperature rises above a required value the motor is driven to cause the actuator 23 to move the rod 22 to the right thus reducing the effective weight of the rolls 17 on the belt 13, and hence the transfer of heat from the steam chests 12 to the web W. If, on the other hand, the temperature sensed falls below the required value the motor is operated to cause the actuator 23 to move the rod 22 to the left, thus increasing the effective weight of the rolls 17 and hence the transfer of heat from the steam chests 12 to the corrugated board W.

An alternative possibility is to provide means for operating the motor so that the effective weight of the rolls 17 is varied automatically with the speed at which the web W is drawn through the machine. In this arrangement the effective weight of the rolls 17 is increased with increasing speed, again so as to tend to maintain the temperature of the board at a constant predetermined value as it leaves the heating section 10. In this embodiment the speed sensoc would be located in the position 28 shown in FIG. 1.

It will be appreciated that it is not intended to limit the invention to the above example only, many variations, such as might readily occur to one skilled in the art, being possible without departing from the scope thereof, as defined by the appended claims.

What is claimed is:

1. Apparatus for supplying heat and pressure to a corrugated paper board comprising heated means for supporting a web of the board as it is drawn thereover, an endless belt whose lower flight is adpated to overlie the web while it is drawn over said heated means and a plurality of freely rotatable transversely extending parallel longitudinally spaced rolls engaging the upper surface of the lower flight of said belt, a plurality of intermediately pivoted levers each having one of said rolls mounted on a downwardly extending arm, a reciprocable rod passing freely through apertures in upwardly extending arms on said levers, there being for each said lever a resilient compression spring surrounding said rod and disposed between the lever and abutment means secured to the rod, each said spring biasing its associated lever in a direction tending to reduce the roll weight pressure exerted on said board, an actuator for controllably varying the position of said rod axially, whereby the force applied by each said spring to its associated lever may be controllably varied to vary the roll weight pressure exerted on said board, said actuator comprising a reversible motor driven mechanism connected to said rod and means automatically responsive to a condition of said board for controlling operation of said actuator.

2. Apparatus according to claim 1, wherein said condition is the temperature of the board at said heated means and heat sensing means is provided for measuring the temperature of the moving board and is operatively connected to control said actuator motor.

3. Apparatus as defined in claim 1 wherein said condition is the speed the board is being drawn over said heated means, and speed sensing means is provided to determine the web speed and is operatively connected to control said actuator motor.

4. Apparatus as defined in claim 1 wherein said levers are bell crank levers mounted to rock about parallel axes that extend at right angles relative to the direction of movement of said board over said heated means.

5. Apparatus according to claim 1 wherein the reversible motor acts on said rod by way of a worm and wormwheel drive.

* * * * *